United States Patent [19]
LaDue

[11] Patent Number: 6,088,431
[45] Date of Patent: *Jul. 11, 2000

[54] METHOD FOR TRANSMITTING VOICE OR DATA IN A WIRELESS NETWORK DEPENDING ON BILLING ACCOUNT STATUS

[75] Inventor: Christoph K. LaDue, Santa Cruz, Calif.

[73] Assignee: Aeris Communications, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/619,363

[22] Filed: Mar. 20, 1996

[51] Int. Cl.$^7$ .................................................. H04M 15/00
[52] U.S. Cl. ........................ 379/114; 379/112; 455/406; 455/407
[58] Field of Search ........................... 379/112, 114–115, 379/121, 130, 140, 144; 455/422, 426, 31.1–31.3, 38.1, 38.4, 507, 517, 466, 405–406, 409, 410–411; 340/825.44

[56] References Cited

U.S. PATENT DOCUMENTS

| | | | |
|---|---|---|---|
| 3,976,995 | 8/1976 | Sebestyen | 340/337 |
| 5,153,582 | 10/1992 | Davis | 340/825.44 |
| 5,289,496 | 2/1994 | Nakagawa et al. | 375/202 |
| 5,526,401 | 6/1996 | Roach et al. | 379/59 |
| 5,577,103 | 11/1996 | Foti . | |
| 5,592,535 | 1/1997 | Klotz . | |
| 5,729,598 | 3/1998 | Kay | 379/115 |
| 5,774,533 | 6/1998 | Patel | 379/127 |
| 5,799,084 | 8/1998 | Gallagher et al. . | |

OTHER PUBLICATIONS

EIA/TIA Standard "Mobile Station—Land Station Compatibility Specification," EIA/TIA 553, Sep. 1989, Cover page through page iii and pp. 2–27 through 2–32.

*Primary Examiner*—Curtis A. Kuntz
*Assistant Examiner*—Duc Nguyen
*Attorney, Agent, or Firm*—Blakely Sokoloff Taylor & Zafman, LLP

[57] ABSTRACT

A method for paging network personal communications system voice and data services comprising transmitting a control channel origination data packet including data specifying an identification number, data specifying a user serial number, a voice airtime register data packet, and a sequence of dialed digits for activating a switch to activate a remote feature access control procedure. The control channel origination data packet is then transmitted through control channels or digital access channels of a paging network. The control channel origination data packet is received and stored cellular base station. The control channel origination data packet is relayed to a mobile switching center and then a selected service may be activated if debit information requirements of a user are met by loading and comparing parameter table values for the identification number and the serial number or the user at the mobile switching center. A personal communications apparatus is also disclosed having a housing and circuitry for transmitting a control channel origination data packet. A speaker is mounted in housing and includes a display screen for displaying data messages and a keypad for entering a landline telephone number or mobile number. A plurality of selection keys allow for selecting a data message for transmission from the apparatus.

17 Claims, 7 Drawing Sheets

METHOD FOR TRANSMITTING VOICE OR DATA IN A WIRELESS NETWORK DEPENDING ON BILLING ACCOUNT STATUS

BACKGROUND OF THE INVENTION

1. Field of the Invention

The present invention relates to "pay-as-you-go" telephone billing systems, and more particularly to "pay as you go" billing systems using a paging network downlink protocol for use in landline, cellular, and broad band and narrow band personal communication system (PCS) wireless communications systems.

2. Description of Related Art

The creation and development of billing systems in general and dynamic real time debit systems has been a central aim of landline and wireless communications since the early days of the communications industry. Most prior dynamic billing systems have, however, failed to deliver an efficient, and secure system. Most cellular and Personal Communications systems (PCS) communications networks use billing systems that are not "dynamic" or "real time", and rely upon accrued or accumulated air time usage records that are drawn from fifteen to thirty day revolving billing procedures and accounting policies. These procedures are generally unsatisfactory and result in a great deal of usage fraud, and delinquent accounts. The results of cellular fraud, and delinquent accounts require cellular and PCS network management to implement tougher customer approval policies. In many urban markets, where cellular and PCS fraud and delinquent accounts are such a prevalent problem a new applicant with good credit will have to pay a deposit ranging from $300 to $1,000.00 just to activate a service. Because of such protective policies about 70% of potential cellular and PCS users are turned down because their credit is not the best and they cannot afford the required deposit.

Therefore it is the primary object of the present invention to provide a unique, secure, and efficient, real time cellular and PCS debit "pay-as-you-go" debit system. The present invention operates seamlessly, and elegantly with all known cellular and personal communications systems (PCS). Such wireless communication systems known and described in Interim Standards or "IS" standard documents, and European Telephone System (ETS) documents known in the art as; cellular IS-553 AMPS, TACS, IS-54B and IS-136 TDMA, IS-95 CDMA dual mode cellular. Other systems such as Global System for Mobile (GSM), DCT-1800, DCT-1900, Personal Digital Cellular (PDC), Digital European Cordless Telephone (DECT), Personal Handy Phone System (PHS), Cordless Telephone systems (CTS), Ardis Data, RAM data, and all other wireless data and voice communications standards. The present invention also utilizes one way broadcast paging systems, analog and digital control channels both physically and logically defined, satellite system control and access channels, digital access channels, and CDMA IS-95 access channel data burst fields. In fact, the present invention provides a debit methodology that is based on combining control, digital access channels, digital control channels, and creates a unique Control Channel Application Data (CCAD). CCAD combines paging, DCCH, SS7, and other system protocols that support voice and data cellular. Additionally, the present invention fully exploits Digital Control Channel (DCCH) messaging services offered by the Ericson Switching Company, in the TDMA IS-136 version, and the CDMA IS-95 DCCH messaging system equivalent offered by Qualcom Corporation of San Diego, Calif.

The present invention creates a truly novel "debit phone" technology. Most prior debit phones cost nearly $1,000.00 each. These phones typically have a credit or debit card slot that the user slides in the card, the phone transmits all the information to the host serving cellular network. Once verified the user can place a voice call.

The present invention provides a simple yet elegant alternative to this cumbersome, expensive and highly unsecured methodology. One serious problem that presents itself with the prior debit systems is that credit card information and other vital user specific information is transmitted and thus become susceptible to cellular hacker scanning devices. The hacker can easily capture this vital information and use for nefarious purposes.

The present invention debit phone costs no more to manufacture than other conventional cellular, PCS or cordless telephone. Furthermore the present invention operates within normal IS-41B and IS-41C signaling network guidelines and is virtually transparent to the host cellular network. IS-41 is a set of standards that uses Signaling System Seven (SS7) a 56 kbps broad band network full duplex protocol that is used throughout the cellular and PCS industry for inter-MSC communications. Also the SS7 network supports many other signaling based activities, and is utilized for the method of the present invention. No infrastructure or other equipment need to be added to any host cellular or PCS network. The present invention creates a master central monitoring station (MCMS) that is a point-of-presence or service control point (SCP) on the SS7 network. The present inventions debit communicator is always deemed a "roamer". Currently there are two major roamer networks; the North American Roamer Network (NACN) and ITE or GTE Mobilelink network. The IS-41 SS7 network is not unlike the Internet for switches and is now ubiquitous throughout the United States. Another 64 kpbs SS7 network is utilizes throughout Europe and Asia. The present invention is preferably "added" to cellular and PCS networks, particularly at the mobile switching center (MSC) and requires only about an hour of system programming time. The programming simply involves updating call treatment and routing parameter tables, and creating a new class of debit service. This programming does not involve updating switch operating system software, or any other aspect that might involve software "patches" and revisions. These switch software patches or revisions are usually handled by the original switch manufacturer. The control channel application data debit (CCAD-DEBIT) system disclosed herein is a dramatic improvement over all prior art cellular and PCS debit systems.

The present invention also creates a Debit Bank Center (DBC). This DBC is connected on the public switched telephone network (PSTN) very much in the same way as automatic teller management (ATM) system. However, the major difference between conventional ATM access and the present invention is that the MCMS is in constant communication with the DBC via carefully encrypted protocols. This dynamic approach is necessary in order to retrieve up to the minute changes in the CCAD-DEBIT phone system user debit account. Any changes or updates can be constantly compared with MCMS debit user records, and the CCAD debit phone timer register data that is transmitted every time the debit user attempts to access the current serving cellular or PCS system for voice and short data packet service. This MCMS and DBC also operates on the Internet and World Wide Web (WW) via frame relay and other signaling methods. Therefore, the present invention will enable easy access to cellular and data services to people that up to now could not easily access these services. Additionally, the present invention removes a great deal of costs, potential fraud problems and risks from cellular and PCS networks. The present invention will dramatically increase cellular and PCS usage by the public-at-large, and relinquish the responsibility of the cellular and PCS carrier from having to maintain a ponderous billing bureaucracy. With the present invention, the CCAD-DEBIT user simply goes to his bank or any ATM and pays funds electronically via his ATM or credit card. If the potential user wants to purchase a CCAD-DEBIT phone from a bank, electronics store or cellular provider, he simply pays for the phone and the dealer assigns his 10 digit CCAD identification number (CIN) and a 10 digit mobile identification number (MIN). The CCAD-DEBIT phone user does not have to pay for service, or sign any contracts. For example, if a CCAD-DEBIT user want to pay a lump sum, for example he pays $500.00, air time is 40 cents a minute for voice and 15 cents a transaction for CCAD-DATA, or some other fee schedule, and he can make periodic checks to the DBC to see how much time he has used. Another feature that is unique is that the MCMS will cause a notice to be transmitted to the user that tells him how much credit he has remaining in his account. This reminder is sent via alpha-paging, or DCCH. The cellular or PCS carrier benefits from the CCAD-DEBIT user business, he shares revenue with the CCAD-DEBIT system provider, but relinquishes the billing problems, for the CCAD-DEBIT system provider and the DBC is responsible for the debit phone users cellular or PCS voice and data bill. One major drawback with conventional cellular and PCS billing systems currently used is that per minute usage is rounded off. For example if a person uses one minute and thirty seconds of cellular or PCS airtime, he pays for two minutes. The preferred CCAD-DEBIT system is incremental, the CCAD-DEBIT phone user pays exactly for what he uses. If he uses one minute thirty seconds of airtime, he pays for one minute thirty seconds of airtime; its all prorated. Another important aspect of the present invention is that it directly enhances cellular and PCS network control functions and signaling routines, and fully supports and enhances voice service. The present invention also enhances and extends cellular and PCS network control, accounting and fraud detection procedures. The present inventions unique debit phone firm ware and software combinations, create a very secure communications system. The CCAD-DEBIT phone has built in physical and logical anti tamper feature.

The CCAD-DEBIT system utilizes an overlay debit system that is added to existing cellular, PCS and mobile satellite system physical and logically defined control channels and digital access channels without the need of adding any hardware or software to these systems. The present invention utilizes home location registers (HLR) and visitor location registers (VLR) that are standard SS7 and IS-41 service control points (SCP) on the SS7 network. These data bases interact directly with mobile switching centers (MSC) for the purpose of maintaining cellular, PCS and mobile satellite customer data files, roamer profiles and other pertinent user data. The present utilizes HLRs and VLRs in a unique and efficient manner, but within standard operational guidelines. The present invention utilizes such standard cellular, PCS and mobile satellite system access procedures as autonomous registration, origination, remote feature access control, CDMA and TDMA digital access data burst, and other like procedures to send its unique debit protocols.

SUMMARY OF THE INVENTION

Accordingly, it is an object of the present invention to provide the Control Channel Application Data Debit System (CCAD-DEBIT), as a means and methodology for creating an elegant, simple, yet secure and cost effect cellular, paging network PCS and mobile satellite based voice and data packet service pre-pay debit system. It is another object of the present invention to provide a debit system on for use on cellular, PCS and mobile satellite physical and logical control channels, digital access channels, digital traffic channels, digital signaling channels, reverse analog control channels, reverse digital traffic channels, digital access channel, TDMA IS-136 and CDMA IS-95 forward and reverse digital control channels (DCCH) that act as short messaging mediums, and SS7 and X.25 signaling protocols. It is another object of the present invention to provide a master central monitoring station MCMS that is configured as a standard SS7 IS-41 compatible service control point (SCP). The present invention also provides a debit bank system (DBC) application specific facility. The DBC is a facilitator/bearer that interacts with the MCMS on the PSTN. The MCMS interacts with the serving MSC on the SS7 network. For example, when a CCAD-DEBIT phone user is traveling in a particular serving cellular, PCS or mobile satellite system, that is a system that serves a particular geographical service area (GSA), metropolitan service area (MSA), or rural subscriber area (RSA), certain unique but transparent procedures transpire. For example, in one scenario, the CCAD-DEBIT phone user has already paid a specified amount for cellular service at a cellular dealer that interacts with a bank ATM, or directly with a bank that offers the present inventions debit cellular voice and data packet service. Once service credit is purchased by the debit phone user, the debit amount is automatically sent to from the DBC to the MCMS and duly recorded. The debit phone user enters a telephone number via the debit phone keypad to make a local area mobile-to-land call, he presses the send button. This "call request" is actually a control channel or digital access channel origination procedure. For example the debit phone user is placing this call in a U.S. AMPS analog cellular system in New York City. The debit phone is configured to operate in a dual mode; digital CDMA and analog AMPS. The control channel protocol used in AMPS analog cellular is based upon a 800 mHz frequency 10 kbps 30 khz wideband frequency division multiplex (FDM), 48 bit word BCH hamming coded protocol. In typical origination access procedures for the AMPS cellular standard, anywhere from three to eight 48 bit control channel words can be transmitted at any given time. Within these 48 bit words are typically contained conventional electronic serial number (ESN), mobile identification number (MIN) and other mobile phone control channel related data. ESN's and MIN's are used by all cellular, PCS and mobile satellite phones. However, the debit phone also utilizes a separate data and one way voice only CCAD serial number (CSN) and CCAD identification number (CIN). The CSN and CIN is also used to place one way voice calls and to receive pages. This particular debit phone is also configured as two way pager and the unit contains a fully integrated pager receiver. The CSN also acts as the pager receivers cap code. The cap code is typically broadcast over a given paging network, but only one pager is programmed to detect the message that contains the capcode. The disclosed debit phone, configured as a combined voice and data unit interacts with the paging and cellular networks uniquely. This paging unit is completely integrated into the phone, and its microcircuitry and operating software fully interacts with the cellular transceiver contained in the phone. In fact, the pager equipped CCAD-DEBIT phone can receive coded instructions from the MCMS to the phone via the PSTN and paging network control center (PNCC). Various unique control and command instructions are sent to the debit phone via the paging network that cause the phone to perform various functions that are known, but can also be unknown to the debit phone user. Another important aspect of the CCAD-DEBIT phone is that it contains non-volatile memory based flash register/timer. This is register is a simple but very effective feature, that produces four digits that are timing increments, that are expressed in values of hours, minutes, and seconds. This timing register is crucial to the CCAD-DEBIT phone, it is a physically embedded register module contained in the phones integrated circuits. Any unauthorized attempt to tamper with, remove, or reprogram will cause the register module (RM) to self destruct. Destruction of this register module will also render the CCAD-DEBIT phone inoperable. The register module also keeps track of all data packet transactions, including received pages and transmitted CCAD data packets. Also, other fail safe security and anti-fraud procedures operate at the MCMS and DBC in order to insure user debit account security and continuity.

When the debit phone user places a voice call, the debit phone transmits its CIN and CSN, four digit voice airtime register numbers, and/or data packet count, dialed digits and other pertinent control channel, or digital access channel origination data. When the debit phone user purchases a specified credit amount, the "credit" data is sent from the DBC to the MCMS data terminals via the PSTN immediately after the user purchases the call and data credit. The transmitted control channel origination packet is received by the nearest serving cellular system base station and then it is relayed to the connected serving MSC. The MSC reads the CSN, ESN and dialed digits certain routine procedures transpire. The MSC recognize that the 34 bit 10 digit CIN; 176-777-1234 and its eight character 32 bit CSN and recognize that the phone is a CCAD-DEBIT phone. Furthermore, the MSC reads all the dialed digits. But, the CCAD-DEBIT phone also contains the register/timer four digit number contained in the dialed digit field. This four digit timer number is not entered by the debit phone user, it is automatically derived and placed in selected dialed digit fields. Therefore the present invention manipulates existing data and data fields that are conventionally designed to contain only dialed digits manually entered by the user, such as when a user dials any seven or ten digit directory number in order to place a mobile-to-land call or a mobile-to-mobile call. The MSC analyses these digits along with other digits, however contained within the CCAD-DEBIT phone origination control channel data packet is a special sequence of dialed digits that cause the switch to activate a remote feature access control procedure. This important procedure is a standard IS-41-3B; parts 3.8 to 4.2, that allows various types of remote features to be activated at a remote home location register (HLR). The CCAD-DEBIT phone preferably always has roamer status so that any serving cellular system that receives its will always relay to the MCMS that will almost always be located at a distant location far away from the serving MSC. When the serving MSC detects the debit phones CSN and CIN it recognizes that this unit belongs to another serving system that is remotely located in another city, state or country. The CIN is identified as belonging to the CCAD-MCMS, that contains a data management and processing service control point (SCP) that receives and sends data to MSCs just like a standard HLR. In order to activate the CCAD-DEBIT phone voice and two way data service, a cellular or PCS network simply loads its CIN and CSN parameter table values at the MSC, and the service is activated, its just that simple. No other equipment, or operating system software upgrades are required. The CIN, CSN, dialed digits and other data are converted to IS-41/SS7 Mobile Application Part (MAP) protocol and sent to the MCMS. By combining standard dialed digit with the four digit register/timer numbers, the present invention creates an application specific data; that is, a data that looks like standard control channel and digital access channel digit data, but is in fact an encrypted and manipulated data, that creates a unique application specific debit and two way paging data. This register/timer data is an application specific data that is "seen" by the serving MSC as standard dialed digit data, but in fact is not. The debit phone user has no direct control over this application specific debit data, it is automatically derived, manipulated, and transmitted along with other convention origination data. Since the register/timer debit data is sent along with other conventional origination control channel and digital access channel data to the CCAD MCMS HLR/SCP via the SS7 network, the MCMS receives this debit packet and reads all the data. Through analyzing the CSN, and CIN, the MCMS identifies the packet as a CCAD application specific debit packet belonging to a particular debit phone user. The register/timer is activated when the debit phone user places a call, or sends a data transaction. If its a voice serving request the serving MSC assigns a reverse voice channel to the debit phone user. If its a simple data message, no reverse voice channel is assigned and the message is relayed because it is contained within the control channel origination packet. When the called party answers the phone the timer records accumulated air time of each call. When the debit phone user terminates the call, by pressing the end button, the timer then stops. If its a simple data message, the transaction is counted. Every time the debit phone user places a call and is approved by the CCAD MCMS, and the serving cellular system MSC, the register/timer activates and records the call duration until it is terminated by the CCAD-DEBIT phone user. When the contained register/timer digits are analyzed and compared at the MCMS, if the debit account is new, and this is the first time the user has requested service, then the register/timer digits should be set to all zeros "00:00". If the account is old, then the received register/timer numbers are compared to the allotted debit limit supplied by the DBC. If the debit phone user has not reached his credit limit, then the call is approved, and the MCMS sends the acknowledgment back to the serving MSC, via the SS7 network utilizing standard IS-41 SS7 mobile application part (MAP) protocol guidelines. If the debit phone user has used up all of his pre-purchased credit, then the MCMS sends a cancellation response to the serving MSC and the call is blocked. When the debit phone user is blocked, the phones software causes a notice to be displayed on its LCD display that reads; "all credit used". The user then knows he must go to his bank, or cellular phone dealer whom also can access bank debit records, and purchase more air and or data time. When the debit phone user purchases more air time at his bank, and subsequently attempts to place a call, the debit phone origination-application specific packet is sent to the MCMS in the heretofore mentioned manner. The MCMS data management terminals compare the received register/timer digits with the last time the user accessed the system. Every time the debit phone user attempts to access the CCAD-DEBIT system, his access record is time stamped, the register/timer digits are recorded along with the units CSN and CIN and electronically filed in the debit phones usage and activation records. Time stamping ensures that all records are kept in a hierarchical relation to when they arrived, compared to when the user purchases new air time and data packet limits, and that previously received register/timer time stamp data can be compared with newly updated register/timer time stamp data. Conversely, bank debit account status can be accurately compared with current MCMS and received register/timer data. In this way, all records are accurately kept, the debit phone user is treated fairly, and fraud and other possible misuses are minimized, if not in fact eliminated. Another important feature of the present invention is that it uses the forward analog control channel FOCC and forward digital traffic channel, to transmit its CIN. The present invention uses the CIN very similarly to how cellular, PCS and satellite systems call or page the user when a land-to-mobile or mobile-to-mobile call is placed. The CCAD-DEBIT is designed not to receive a voice call, it can only receive a page from the one way paging network, or receive a message from the serving cellular networks TDMA-DCCH or CDMA-DCCH type forward messaging channel. In this way the debit-phone is not issued an MIN number, it has a programmed CCAD Identification Number that looks like a ten digit telephone number but in fact is not. The CIN is used for one purpose with the debit phone, and that is to cause the register/timer that is embedded in the CCAD-DEBIT phone to return to zero. For tighter security, the debit phone also receives simultaneously with the CIN transmittal, an encrypted command message from the MCMS via the one way paging network, or the serving cellular carriers CDMA-DCCH or TDMA-DCCH forward messaging pathway. Both the encrypted code and the transmitted CIN cause the debit-phone register/timer to return to zero when the debit phone users debit account has been updated with new voice and data time purchases entered at the DBC, subsequently recorded and time stamped at the CCAD-MCMS.

Another important feature of the present invention is its two way data debit based messaging and two way paging capabilities. For example, application specific messaging that goes beyond the four digit register/timer data can be transmitted along with the CCAD-DEBIT control channel origination packet In one configuration, the CCAD-DEBIT phone is programmed to transmit predetermined "canned" data message responses. For example, the CCAD-DEBIT phone user receives a page from the one way paging network, the serving cellular systems TDMA-DCCH or CDMA-DCCH forward messaging pathway, the debit phone user can transmit up to 15 messages. One message, for example, message 6 reads "will call you in ten minutes". All the user has to do is press the menu button, select the two way paging function, then select message six, press the set button, then press send. The debit phone transmits a normal CCAD control channel or digital access channel origination packet. However, in addition to the timer register/timer digits, and instead of containing dialed digits for placing a voice call, the CCAD origination packet contains the pager calleris seven or ten digits telephone number. The CCAD control channel origination packet contains a data packet transaction counter field, that is produced by a data packet counter register software that also drives the register/timer module. This data packet counter is produced within the same construct as the register/timer that is used for measuring accumulated voice usage air time. When a CCAD debit phone two way paging message is transmitted preferably only the data packet usage digits are contained in the same register/timer fields. Once the CCAD control channel origination packet is processed by the MSC and relayed to the CCAD MCMS via the SS7 network, MCMS data management data bases go to work. The MCMS verifies the user, and returns an appropriate acknowledgment response to the serving MSC. This response causes the switch not to reserve or seize a forward voice channel, and to complete the two way paging data "call" by sending a forced release order to the CCAD-DEBIT phone user via the overhead signaling that occurs on the FOCC channel or forward digital traffic channel. Thus, the present invention creates a two way paging system, and the user is charged a flat rate for the two way paging packet transaction. The CCAD Debit phone user can pay for two way paging services or not, this is an optional add-on service to the CCAD voice service.

The remote feature access control is a standard IS-41 feature that allows a mobile user to manually enter call routing instructions to his home HLR, once received the HLR that causes all of his mobile or land calls to be routed to another destination. Also message waiting indicators or sent back to the user via the SS7 network to the current serving system, and then relayed to the mobile phone user via forward channels. The present invention utilizes the remote access feature control parameter quite uniquely, for it becomes an application specific data message medium in the disclosed methodology. The Remote Access Application Message (RAAM) feature looks like a normal origination remote feature access control packet, that is part of the present inventions means and methodology. In this way the present invention creates a manipulated data within control channels and digital access channels, but in fact creates a manipulated data in the SS7 signaling network, because the CCAD-DEBIT RAAM packet "looks" like normal remote access feature control data packet In still another scenario, the present invention provides the means and methodology to create another short messaging system, that is truly novel in its scope, that in effect creates an incredibly robust and elegantly efficient application specific, signaling network and air-interface protocol driven short packet data messaging system.

To achieve the foregoing objects, and in accordance with the purposes of the invention as embodied and broadly decried herein, specialized data communications protocols and communications apparatuses are provided that provide a fully comprehensive cellular, PCS, Global System and mobile satellite voice and data service application specific control channel application data debit system (CCAD-DEBIT). This system utilizes existing data and data fields to produce a manipulated data and creates and application specific debit data. This debit data is transmitted on physical and logically defined control channels. Control channels are broadly defined herein as signaling channels, digital traffic channels that contain logically defined digital access channels, digital signaling channels, primary digital access channels, secondary digital access channels, fast associated control channels, slow associated control channels, authentication channels that utilize analog FSK, digital TDMA, digital CDMA, quadrature shift key control channel protocols, and other wireless analog and digital network platforms that are specified in official documents generically designated as Interim Standards (IS), published by the Telephone Industry Association (TIA), American National Standards Institute (ANSI), and standards set by the European Telephone Standard committee (ETS).

Additional objects and advantages of the invention will be set forth in part in the description which follows, and in part will be obviously from the description, or may be learned by practice of the invention. The object and advantages of the invention will be realized and attained by means of the elements and combination particularly pointed out in the appended claims.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiments given below, serve to explain the principles of the invention.

DETAILED DESCRIPTION OF THE PREFERRED EMBODIMENTS OF THE INVENTION

Reference will now be made in detail to present the preferred embodiments of the invention illustrated in the accompanying drawings. In describing the preferred embodiments and applications of the present invention, specific terminology is employed for the sake of clarity. However, the invention is not intended to be limited to the specific terminology so selected, and it is understood the each specific element includes all technical equivalents which operate in a similar manner to accomplish a similar purpose.

Figure 1:
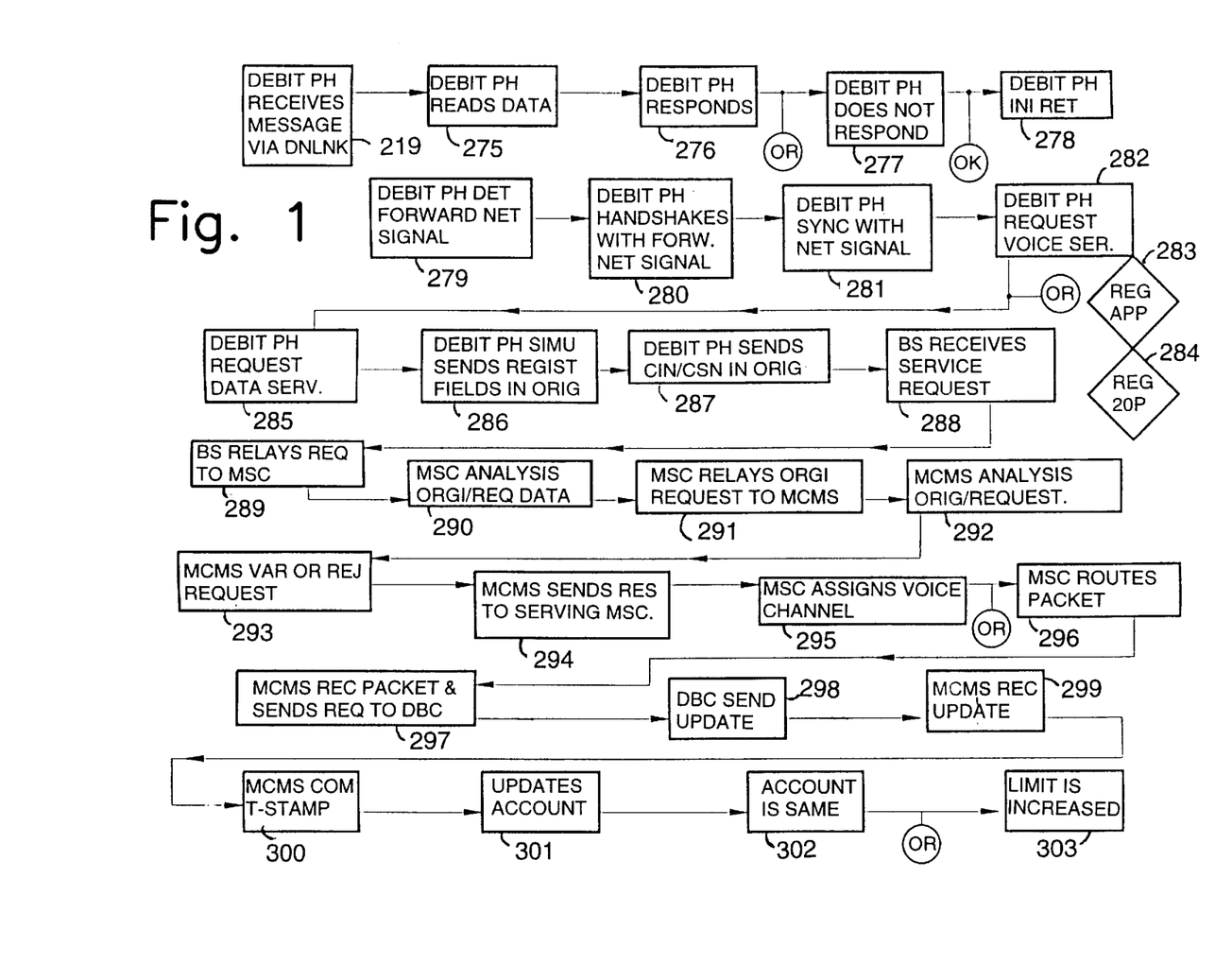
FIG. 1 is a logical block diagram of the CCAD-DEBIT communication protocol, according to the invention.
Figure 2:
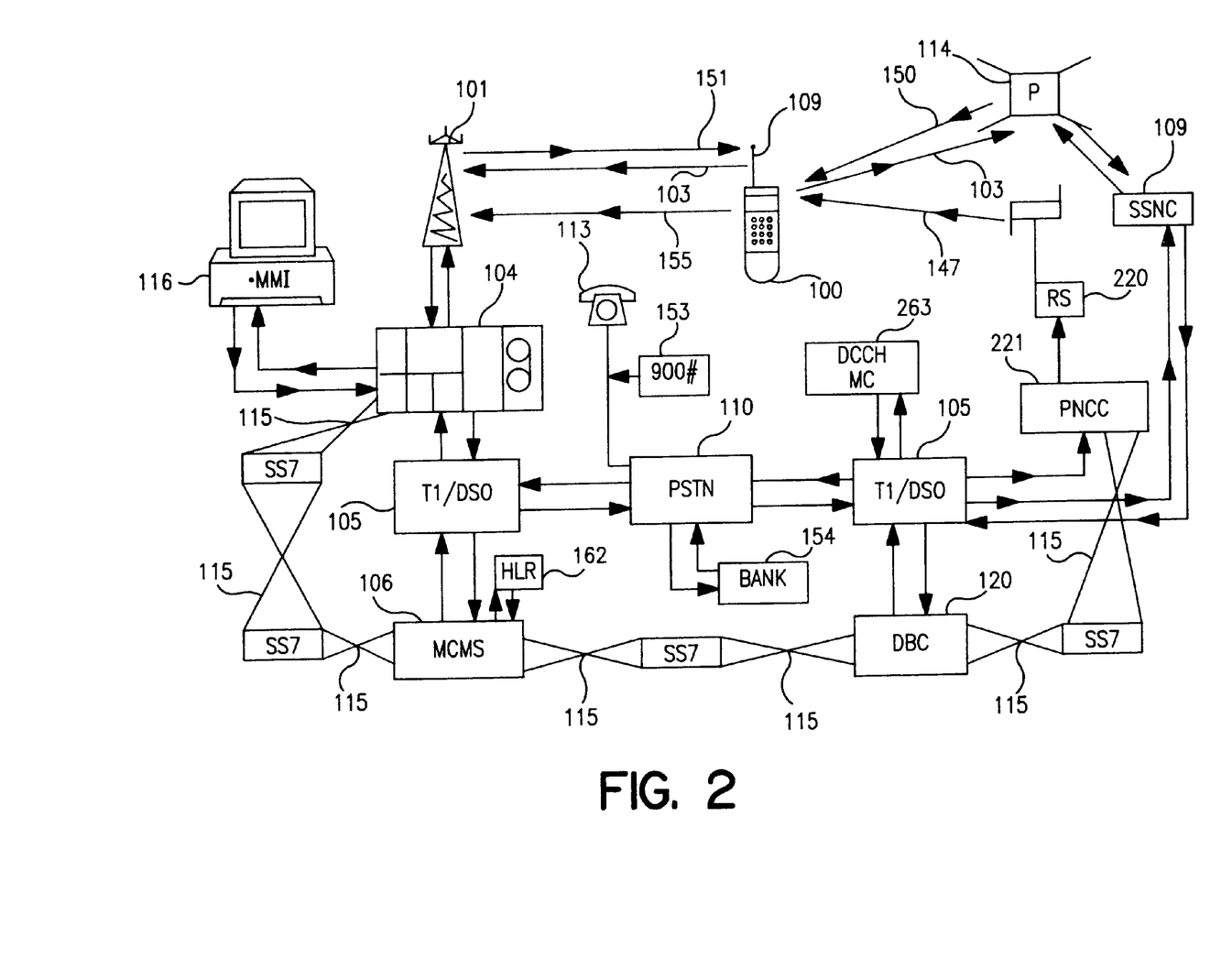
FIG. 2 is a CCAD-DEBIT system data and voice communications system and apparatus, according to the invention.

Referring to FIG. 1, a CCAD-DEBIT communicator, receives a message 219 from the MCMS via a selected air-interface down link. The communicator is shown in FIG. 2 as debit phone 100. A downlink in terms of the present invention is defined as a message transmitted via a one way paging network; or a message transmitted via the DCCH pathway of a host cellular network configured for forward messaging specified in Interim Standard 136; or a message transmitted via the DCCH pathway of a host cellular network configured for forward messaging specified in Interim Standard IS-95; or a message transmitted via forward data pathway of a mobile satellite downlink; or a message transmitted via a forward analog control channel FOCC as specified in Interim Standard IS-553; or a message transmitted via a forward DCCH message from a Global System for Mobile (GSM) signaling and/or authentication channel. The debit phone then reads the data contained in the received downlink message 275, the debit phone evaluates and responds to received downlink message 276, or does not respond 277 if message does not require a response at this time. If debit phone needs to respond, it initiates a return response 278. The debit phone scans and detects forward downlink network channels of host serving cellular, PCS, GSM or mobile satellite system 279. Next, the debit phone handshakes with forward network channel 280. Preferably the debit phone then synchronizes and is assigned a channel, and prepares to send origination data burst 281. The debit phone origination preferably contains a request for voice service 282, and contains a CIN/CSN, for registration approval and call routing 283. The origination packet also contains register/timer fields with, for example, 20 minutes of air-time remaining 284. Or the debit phone request data service 285, debit phone simultaneously sends registration and authentication information in origination packet 286, sends CIN/CSN in origination packet 287. The base site receives and detects service request contained in debit phone service request 288 and relays debit phone service requests to serving MSC 289. Serving MSC analysis origination request by scanning and detecting CIN/CSN and remote access application message (RAAM) indicator contained in dialed digit fields 290. The serving MSC relays origination/registration and contained dialed digit field data to MCMS 291. MCMS analyzes the origination/registration request 292. MCMS verifies or rejects request 293 by sending either a service approval or service rejection indicator to the serving MSC via the SS7 network 294. If MCMS approves voice service, the MSC and visitor location register (VLR) assign a temporary sutto number to the debit phone user and assigns reverse voice channel 295. Or if this is data service request, it sends a data service approval/completion of call indicator to the serving MSC, and simultaneously sends a sutto number cancellation invoke indicator to the VLR, and MCMS routes packet to its application specific destination. The application specific destination can be a two way paging response center or other facilitator. The MCMS, after receiving the request preferably sends an account update to the debit bank center (DBC) 297. DBC immediately responds and sends debit phone user account update information 298. MCMS receives update 299, and time stamps update 300, and then adds new debit account information 301. The account debit limit is the same as a previous inquiry 302, or account limit is increased 303. In this scenario, the debit phone user is sent a register/timer update account packet in two ways simultaneously. First of all the CIN is sent to the debit phone user via the MCMS to the serving systems MSC, whereby the MSC sends the debit phone users CIN as cellular system page to the debit phone via the FOCC or forward digital access, paging or traffic channel. The CIN is then received. The second encrypted message is sent via a designated downlink pathway, preferably via the heretofore mentioned transmission mediums. When the debit phone receives the encrypted register/timer reset invoke, the register/timer is set to zero.

Referring to FIG. 2, this illustration depicts an CCAD-DEBIT system. A preferred CCAD-DEBIT system air interface and network element is designated. The CCAD-DEBIT phone 100 transmits a control channel application data packet (CCAD) 103. This data packet contains the CCAD origination-remote application message (RAAM) activator, the CCAD debit register/timer-four character data fields, and other pertinent origination data. The CCAD data packet 103, is transmitted to the nearest serving cellular or PCS base site 101, or to a mobile satellite, in this example an Inmarsat P mobile satellite 114.

Figure 3:
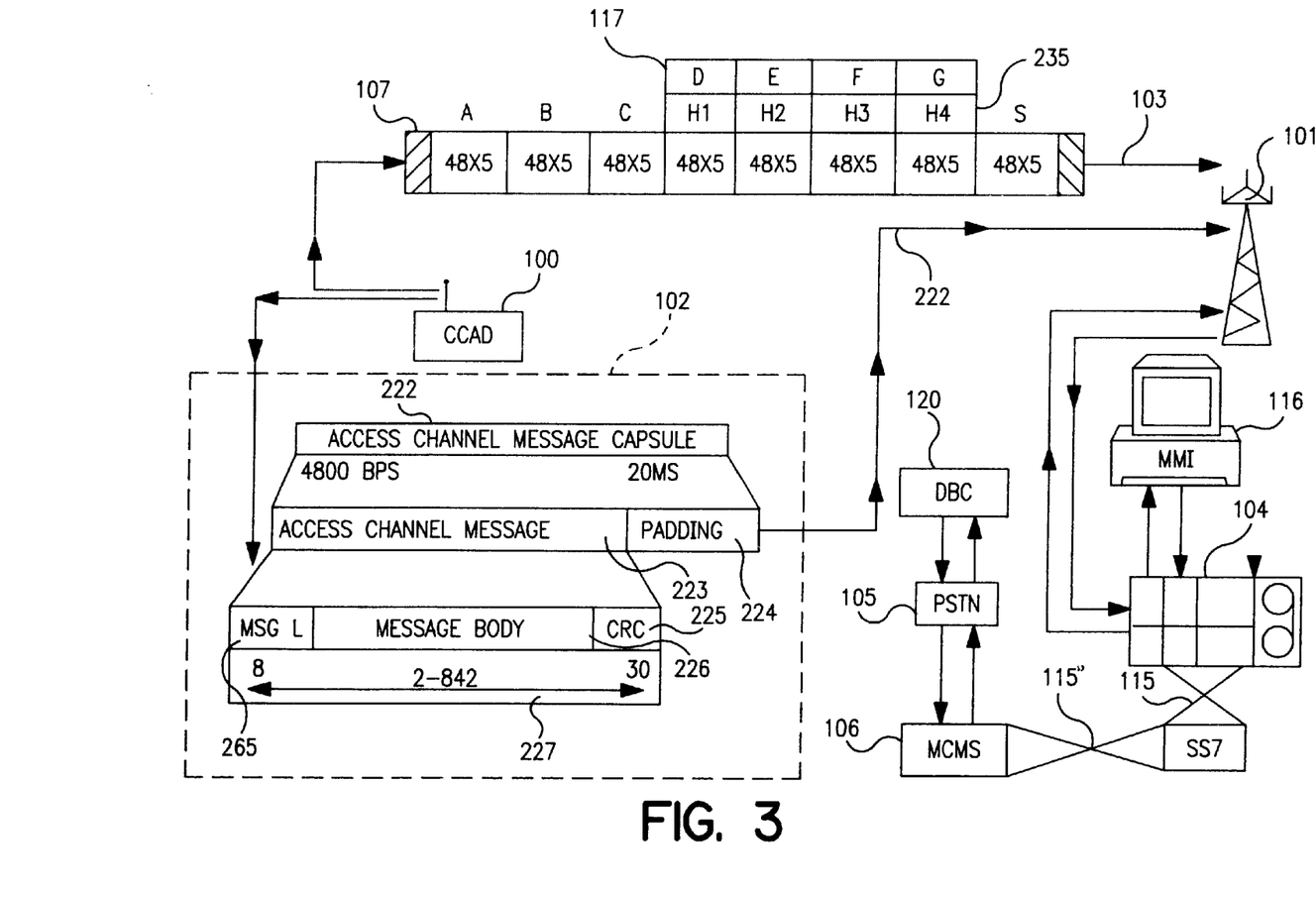
FIG. 3 is a logic flow diagram of the CCAD-DEBIT application data message and processing system, according to the invention.

In to FIG. 3, the air interface protocols expressed in this illustration are based on the AMPS IS-553 analog RECC control channel standards 107 and the CDMA IS-95 digital access channel standards 102. The CCAD-DEBIT phone 100 is preferably configured as a D-AMPS or dual mode amps phone that is compatible with AMPS analog and IS-95 CDMA digital air interface protocol standards. If a dual mode debit phone user travels into a serving cellular system that is compatible with only the AMPS analog standards then the CCAD-AMPS protocol 107 is used. This packet of data is composed of seven 48 bit analog RECC control words. If the dual mode debit phone user travels into the serving area of an IS-95 CDMA compatible system, the CDMA packet 102 is used.

Figure 4:
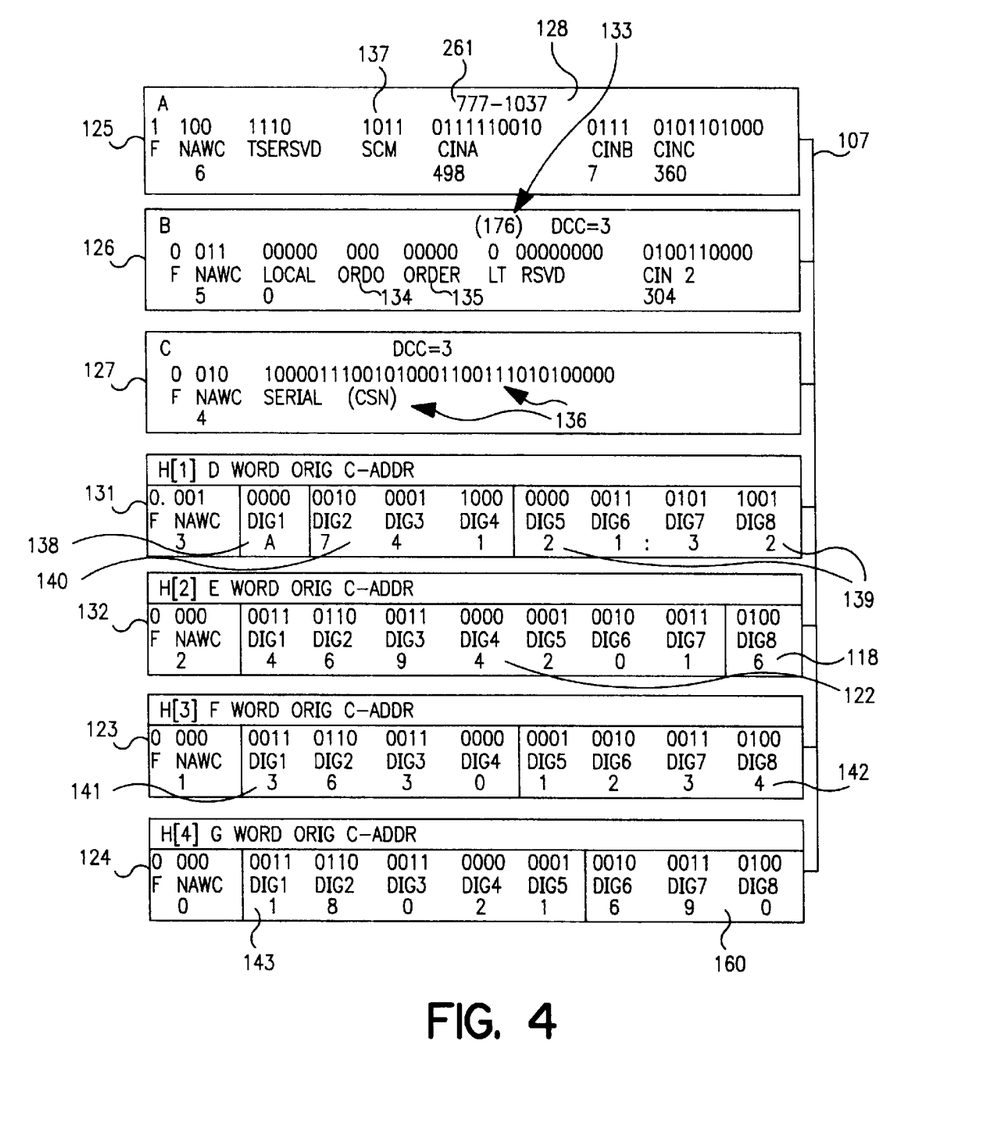
FIG. 4 depicts a CCAD-DEBIT analog FSK 10 KBPS RECC control channel origination data packet message, according to the invention.

In FIG. 4, the CCAD-AMPS application specific data packet 107 is shown here divided into seven separate 48 bit RECC words. The IS-553 AMPS RECC reverse control channel protocol depicted here will allows for up to eight 48 bit words to be transmitted in one burst. This particular example is based upon a standard origination data packet, but in fact contains data that is particularly configured for the CCAD-DEBIT system. For example the A-word 125 contains the station class mark (SCM) "1011" 137 that designates this phone as a debit phone. The CCAD Identification Number CIN comprised of a three digit office code 261, a four digit node code 128, and in the B word 126, the three digit number plan area (NPA) or area code of the CIN are shown here 133. Together, this ten number code comprise the CIN. This number looked like a conventional ten digit directory number. A person dialing this number from another mobile or from a landline phone could not reach the debit phone user with the CIN number. The CIN and CSN are used for debit phone identification by the serving MSC and the CCAD MCMS. As heretofore mentioned, the CIN is also used for debit phone register/timer security and control, coupled with another encrypted data code that is sent to the debit phone via another downlink path, together create a two key encryption method. In word C 127 the CCAD Serial Number (CSN) 136 represents the CCAD-DEBIT phones serial number. The CIN and CSN are used together for registration, origination and over all unit identification for MSC, SS7 network and CCAD MCMS data analysis and processing procedures. The D word 131 is a standard configured origination packet; first word of called address, used to send dialed digits entered by a conventional mobile phone user. However, with the present invention, the D word is designated the application specific H word one; or H[1] word 131. For CCAD debit phone registration purposes, H[1] word 131 is sent to the MCMS with the A, B, and C words. The H[1] word may contain other application specific data, that is not manually entered by the user. In fact, all CCAD H words are preferably automatically derived via CCAD Debit phone firmware and software means. The CCAD Debit phone has no direct control over what is contained in the CCAD H word data fields. All data in this H[1] example 131 is derived with embedded software and hardware automatically. For example the E word or second word of the called address is designated by the debit phone system as the H[2] word 132. Depicted in this word is the two way paging response-call back number 122. Where normally this word would contain a number to be directly trunked to the PSTN and called by the serving MSC, instead this number is the pager querent or caller whom paged the debit phone user. Furthermore, this number along with message number 6, 118 for example, is being sent to the CCAD MCMS. Once received the pager querent number is preferably fed into a specialized voice mail system that uses the number to call, the party, the party picks up the phone and hears message 6 "sorry I cannot talk right now, will call later tonight", for example. The third and fourth word of the called address are also designated by the present invention as the H[3] word 123 and the H[4] word 124 respectively. Each contain application specific data that contains information relevant to global positioning satellite information and other location triangulating data, 141, 142, 143 and 160. These data fields can be used for all manner of additional debit system security and service related applications. These analog H words and the entire AMPS IS-553 based protocol depicted here is but one example of analog and digital control channel and digital access channel protocols that can be used by the present invention for the purpose of implementing the CCAD Debit system in the Cellular, PCS and Mobile Satellite industries.

Figure 5:
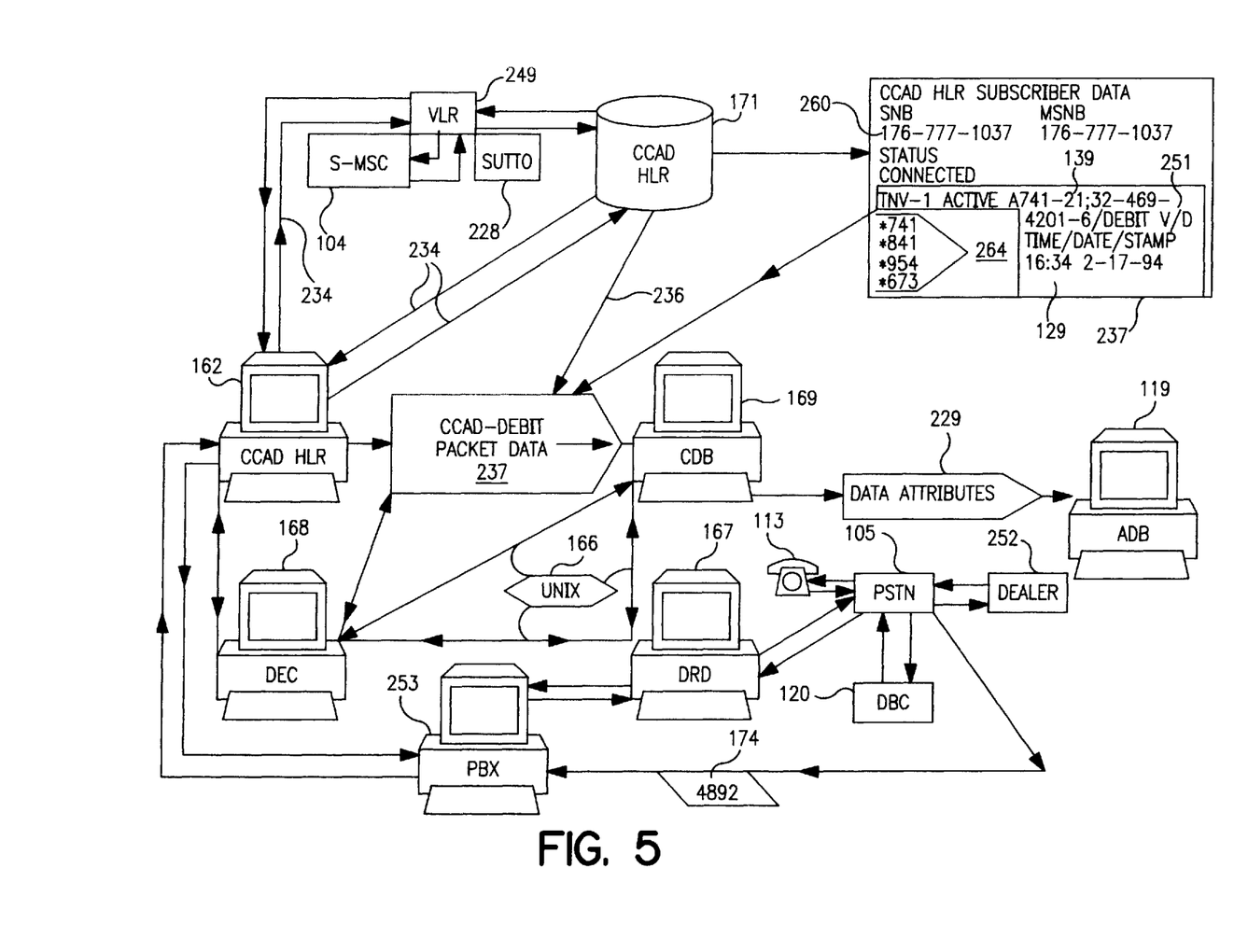
FIG. 5 is a logic flow diagram of the CCAD-DEBIT MCMS HLR/SCP processing system, according to the invention.

Referring now to FIG. 2, the man-machine-interface (MMI) 116 is a preferably Unix based computer terminal utilized by cellular network signaling and switch technicians to enter new data in parameter table data files. These mobile identification number MIN data files are used by the MSC to identify systems that various MIN numbers belong to. The present invention uses these files in the same way, however, the CCAD Debit phone CIN is used only for appending IS-41/SS7 specific global, cluster and node codes so that MSC software knows where to direct the debit phone packet to the MCMS on a particular SS7 network, such as the NACN. Once the MSC identifies the MCMS's HLR 162 as a bonafide point-of-presence on the SS7 network, it relays the entire CCAD Debit phone application specific origination/registration packet to the MCMS 106. Once a particular CCAD Debit phone origination/registration packet arrives, the following procedures preferably occur as seen in FIG. 5. The received CCAD-DEBIT phone packet arrives and is converted from SS7/IS-41 packets to CCAD HLR readout data format 237. Within this readout is the CCAD-DEBIT phone CIN 260, and the register/timer digits 139 that make up part of the debit phone user active profile. Within this profile is the called number, and the type of service the debit phone user has activated; such as both voice and data indicators 251. Additional information contained within this string is the register/timer accrued time indicator 139. When the packet arrives it is immediately time and date stamped 129.

In FIG. 5, normal IS-41 and SS7 requirements specify that an operating SS7 service control point (SCP), such as an HLR must be redundant. The CCAD-MCMS is preferably designated as an HLR/SCP, and therefore two HLR's have to provided and have an on line status. If one HLR fails then the other one immediately takes over. So the CCAD MCMS has two HLRs, one co-located at the MCMS 162, and one remotely located at another physical location 171. The remote HLR 171 can be placed in another city or region, as long as it is not located on the same power grid as the co-located HLR 162, so that a local power failure will not cause both HLRs to fail. The decoder terminal 168 contains data algorithms that continually search for the debit phone packets 237. When the DEC terminal 168 detects a debit phone packet 237 it captures it and relays it to the comparative data base (CDB) terminal 169 and looks up the user's current debit limit and compares it with the received information contained within the most recently received debit phone packet 237. If there is enough debit credit remaining, and register/timer received logically matches the last register/timer data received, it initiates a registration and current call approval response, and forwards it to the CCAD HLR 162 and 171, and the CCAD HLR relays it to the serving MSC 104 via the SS7 network. The serving MSC allows the voice call to be placed. If the debit phone user is requesting two way paging packet transfer approval, the same procedure applies. Referring to FIG. 4, if the debit phone user's debit account has remaining credit for air time and data packet transactions, the two paging querent number 122, and the message indicator 118 essentially flags the MCMS and instructs the decoder terminal that this a data packet transfer request, and not a request for voice service.

If the H[2] word 132 does not contain a message number indicator 118, by showing a readout of "0" then the decoding terminal flags the packet as a voice service request origination/registration voice service request packet (VSRP).

Referring to FIG. 5, in still another scenario, if the debit phone packets register/timer data counter fields 129 indicate to the comparative data base (CDB) 169 that all credit has been used, then a service block indicator is relayed to the serving MSC via the CCAD HLR. However, the CDB 169 continually updates it debit account information by constantly interrogating the Debit Bank Center (DBC) 120. The CDB 169 preferably interrogates the DBC via the data reception and distribution (DRD) terminal 167. The DRD controls a direct link data frame relay link to the DBC. The DBC can be a cellular, PCS, or mobile satellite system. Or, alternatively it can be regular bank, that offers cellular, PCS and mobile satellite debit services.

In FIGS. 2 and FIG. 5, a bank's 154 automatic teller (ATM) system can be integrally tied to the DBC 120. The debit phone user can simply go to his bank or any ATM that is configured to provide voice and data debit services and purchase air time and data packet credit. The debit phone users cellular point-of-purchase dealer 252 can be configured to interact directly with the MCMS and act as a debit user data base.

In FIG. 5, the dealer 252 can also access the users credit card and ATM accounts. There are many ways to configure these features. Essentially, whatever the circumstance, the MCMS is constantly interrogating the Debit Bank Center (DBC) 120 to receive new debit user account information updates for purposes of providing a trouble free service, and to protect against misuse and fraud. The constant comparison of date, time stamp and register/timer information most recently received with previously received information, coupled with continuous DBS interrogation ensures a secure and efficient CCAD Debit phone system. Additionally, there are other important features of the CCAD-DEBIT phone system.

Figure 6:
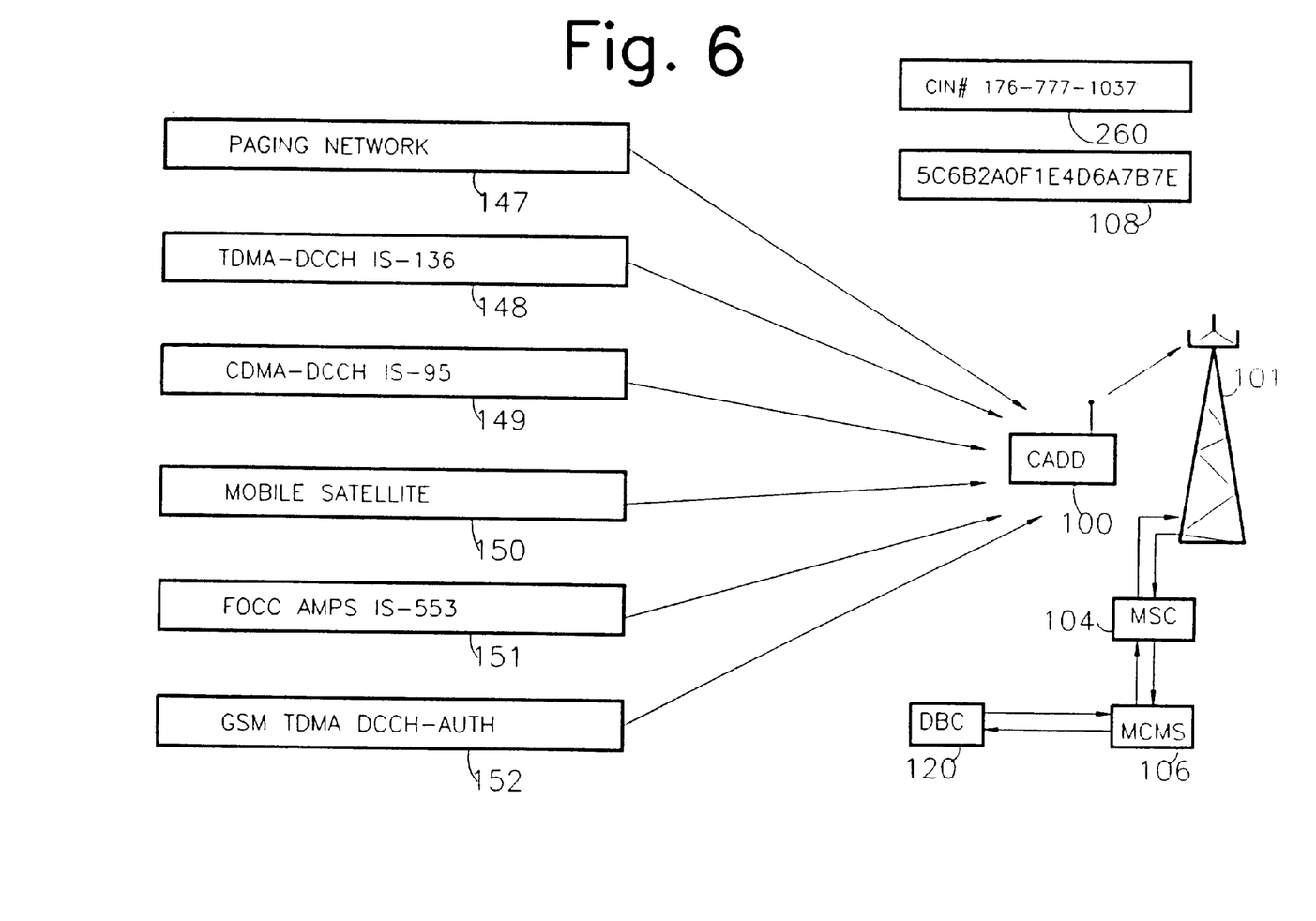
FIG. 6 depicts multiple forward downlink data pathways, according to the invention.

Referring to FIG. 6, there are depicted six different versions of downlink protocols. A paging network protocol 147, a TDMA DCCH IS-136 protocol 148, a CDMA DCCH IS-95 protocol 149, a mobile satellite protocol 150, an analog AMPS IS-553 FOCC protocol, 151, and a Global System for Mobile digital access channel-authentication channel protocol 152. Each protocol serves its own function, and interrelates with other depicted protocols. This interrelation involves the augmentation and support of debit account management, anti-fraud and the delivery of alphanumeric messages to the debit phone user. For example, some of these messages are for the two paging service provided, and other messages relate to debit limit notification. Still another important function is the two key encryption and anti-fraud parameter that is designed for the CCAD Debit phone system. For example if a debit phone is configured to operate in a IS-553 AMPS cellular system and one way paging broadcast system, the following communication procedures apply. In FIGS. 5 and 6, one possible scenario is the debit phone user has just purchased another block of voice service time, and data packet transactions. His last access attempt revealed that he has accrued 21 minutes and 32 seconds of voice service air time. However recent DBC 120 interrogation has just revealed that he purchased another two hours of voice time and 30 additional data or two paging transactions. The time stamp applied to the most recently acquired DBC record, compared with previously received origination/registration data and time-stamping, and register/timer data, reveals that he has updated his debit account. Therefore, this particular debit phone users voice time and data transaction register/timer count has to be reset. The preferred resetting procedure is as follows. Assuming, this current debit phone is configured for one way paging and analog AMPS service; the MCMS 106 sends the debit phone user CIN number 260 to the serving MSC 104, the MSC transmits a page over all base stations 101 connected to it. Contained within this page is the debit phone user's CIN number 260. The debit receives this number. Simultaneously, another encrypted message to sent to this same debit phone via the serving paging network. Referring to FIG. 2, the MCMS 106 sends a message que to the Paging Network Control Center (PNCC) 221, CCAD debit phone is an encrypted code 108 as depicted in FIG. 6.

In FIG. 2, the PNCC 221 sends the message to the nearest paging network transmission tower located in the serving systems geographic service area (GSA). Once the debit phone receives the encrypted code message, the register/timer is set to all zeros. The encrypted code message 108, combined with the CIN 260 create a two key encryption system for use with the CCAD Debit phone system. In yet another example, the debit phone is configured as a code division multiple access (CDMA) IS-95 compatible full duplex voice and data communications device.

Referring now to FIG. 3, the CDMA access channel protocol 102 contains various potential application specific elements. The access channel capsule 222 contains the access channel message 223. Contained within this message is the variable message length body 226. The message body 226 allows for two to 842 bits or 210 characters of data to be transmitted in one burst. The message structure preferably contains bit designations 227 that insure a robust application specific data burst protocol. The message length field 265 tells the base site and MSC what message length it is. For example, if the message length is 110 bits, the eight bit message length field would reflect that quantity. The padding feature 224 of the CDMA access channel message, creates a "bit filler" mechanism. In terms of CDMA access channel protocol procedure the access channel capsule can never vary in length. However, internally the padding feature "fills in" vacant data bit fields within the message body. For example, if the message equals 110 bits, but the bit fields call for an additional 732 bits, the padding fields take up the vacant data fields with binary zeros. The cyclic redundancy rate 225 ensures data bit integrity, by constantly checking data content quantity and other factors. The CDMA digital access channel structure essentially operates in the same manner as the AMPS RECC analog reverse control channel structure depicted in FIG. 4.

The present inventions debit phone origination/registration methodology, applied to the present inventions version of CDMA-RAAM procedures operate with the MSC call parameter tables, and host IS-41/SS7 network in the same manner as heretofore described. The only real difference between the AMPS-IS 553 debit phone procedure and the CDMA-IS-95 debit phone procedure is how the phone itself is configured to operate within the guidelines of these two different air-interface protocols. MSC and MCMS voice call treatment and data packet treatment is essentially managed in the same heretofore described manner. By way of illustration in FIG. 3, the origination/registration packet 107 with four H words 235, also construed as called address words 117 are managed in the same manner as the CDMA digital access channel protocol 102.

In FIG. 6, the debit phone 100 is configured to operate totally in a CDMA-IS-95 environment. In FIG. 5, the CDB

169, initiates a downlink message to be sent to a debit phone user. The CDB prepares the message for the DCCH message center 263, and sends it over the PSTN 110, via T1/DSO protocols 105, and these protocols are used routinely on the PSTN 110. The DCCH message center 263 receives the message and relays it to the serving MSC 104, via the PSTN 110. The CCAD debit phone receives the downlink message via the CDMA IS-95 DCCH forward digital control channel downlink 151. The message can contain a page from a caller using a phone on the PSTN 113, an encrypted message, or an alpha message informing the debit phone user that his debit limit has been reached. The two paging response is contained in the origination/registration packet that the CDMA debit phone compiles and transmits, and the data is handled by the serving MSC in the same manner as heretofore described. Therefore, the CCAD CDMA IS-95 compatible debit phone provides a self contained full duplex voice and data debit system. In FIG. 6, a TDMA IS-136 downlink message 148 can be used. In fact if the CCAD Debit phone is configured to operate totally in a TDMA IS-136 environment, or a GSM environment, or a CDMA environment, or a mobile satellite environment, MCMS and data management procedures would not vary. The key is how each debit phone is configured. For example, A CCAD Debit phone can be designed to receive broadcast pages 147, and send origination/registration data packets on GSM digital access channels, and make voice calls on GSM digital traffic channels. The RAAM feature operates the same. In fact the RAAM feature can operate on all known cellular, GSM-PCS. CDMA IS-95, and TDMA IS-136 network platforms, as long as these platforms are compatible with IS-41/SS7 signaling network parameters. To date, all known cellular, PCS and GSM platforms operate utilizing the remote feature access control parameters that the present inventions RAAM procedures fully exploit. All of the heretofore mentioned platforms also will accept specialized CINs and CSNs, in fact the CIN can be sent and transmitted on the forward page procedure in the same procedural manner.

As seen in FIG. 2, the MCMS 106 can send messages to debit phones that are dual satellite and cellular compatible. The debit can receive messages from a mobile satellite, such as the Inmarsat P satellite 114 depicted here, as long as the phone is so configured. The MCMS 106 simply sends a message via the SS7 network 115 or the PSTN network 110, and the satellite system network center ground station or hub 109 transmits an uplink message, and the satellite relays and transmits the message to the CCAD Debit phone 100.

The present invention provides a unique means and method of implementing a "caller pays" land-to-mobile calls methodology to the CCAD Debit phone. In FIG. 2, the caller, using a landline telephone 113 places a call using a "900" number 153. The 900 number land-to-mobile call is routed the MCMS 106. The MCMS interrogates the CCAD HLR 162, 171 to find out which serving cellular, or PCS or mobile satellite system the debit phone user is operating in. Every time a MSC sends a origination/registration invoke request to any HLR, including the CCAD HLR, the MSC sends a carrier identification code (CHIC) that essentially identifies which serving cellular system is sending the message, and in particular which MSC is sending the origination/registration invoke request. Every time an MSC sends the origination/registration invoke request the CIC code is sent in the same IS-41/SS7 packet. The CIC code therefore is equated with a serving system location, represented by the MSC 104.

In reference now FIG. 5, the serving MSC 104 is connected to a visitor location register (VLR) 249. The VLR is a data base that is also a service control point (SCP) on an IS-41/SS7 network. In fact the VLR operates almost exactly like an HLR. The VLR keeps records of all roaming mobile users actively operating in that particular serving system for a 24 hour period. Each roaming mobile is assigned a sutto number. This number is used if any calls are received at the MSC, that are designated as active roamers. When a roaming mobile first registers in a serving MSC operations area, the home cellular or PCS systems HLR is interrogated in the same manner as heretofore described. If the mobile roamers electronic serial number (ESN) and the mobile identification number (MIN) is sent to the home system HLR, and if the roamer's data files are present in the HLR and his account is in good standing, the HLR then sends a registration acceptance message along with a roamer profile to the serving MSC. The serving MSC downloads the successful registration result, the roamer profile and assigns a sutto number. The VLR duplicates the roamer profile, and assigned sutto number and sends it via the IS-41/SS7 network to the home HLR. Therefore, a current location of all active and registered users is always maintained. Referring to FIG. 5, when the land-to-mobile "900" number is dialed by a landline PSTN caller 113, the call is routed to the MCMS HLR 162, 171 via the MCMS automatic voice/mail-PBX system 253. The caller hears a pre-recorded voice say, for example, "please enter your personal identity number" (PIN) 174. The caller enters the PIN number, and the PBX system 253 interrogates the comparative data base (CDB) 169 checks its own files and compares the PIN number just received with the all debit phone user PIN numbers stored. Once the PIN number is validated, the CDB 169 sends a PIN acknowledgment invoke, plus the debit phone users CIN and CSN number to the PBX system 253 which in turn interrogates the CCAD HLR 162, 171, and checks for most recent location and sutto number assignment. Once the sutto number has been pinpointed, the HLR sends the sutto number and the most recent serving MSC CIC number to the PBX system 253, and essentially routes the call to the serving MSC 104 VLR 249.

In FIG. 2, the serving MSC 104, pages the debit phone user, by transmitting his CIN number via the base station utilizes the analog FOCC forward control channel, or digital access forward primary or secondary paging channel. Once contacted, the debit phone user presses send and the call commences. In a referred application, the caller preferably pays only when the debit phone user answers the call, so any air time charges are absorbed by the 900 or 800 number charges. Once the call is terminated by the landline caller 113 or the debit phone user, no more 900 or 800 number charges are incurred by the caller. The debit phone register/timer status has not been effected by this land to mobile call. No other calls can be placed to the debit phone user, unless the PIN number is entered and the landline caller uses the 900 or 800 number service. In no way can some accidentally dial the CIN number and reach the debit phone user. The CIN is only used for identification, routing, 900 number call forwarding, which is essentially the method used here by the present invention, but in a unique way.

Figure 7:
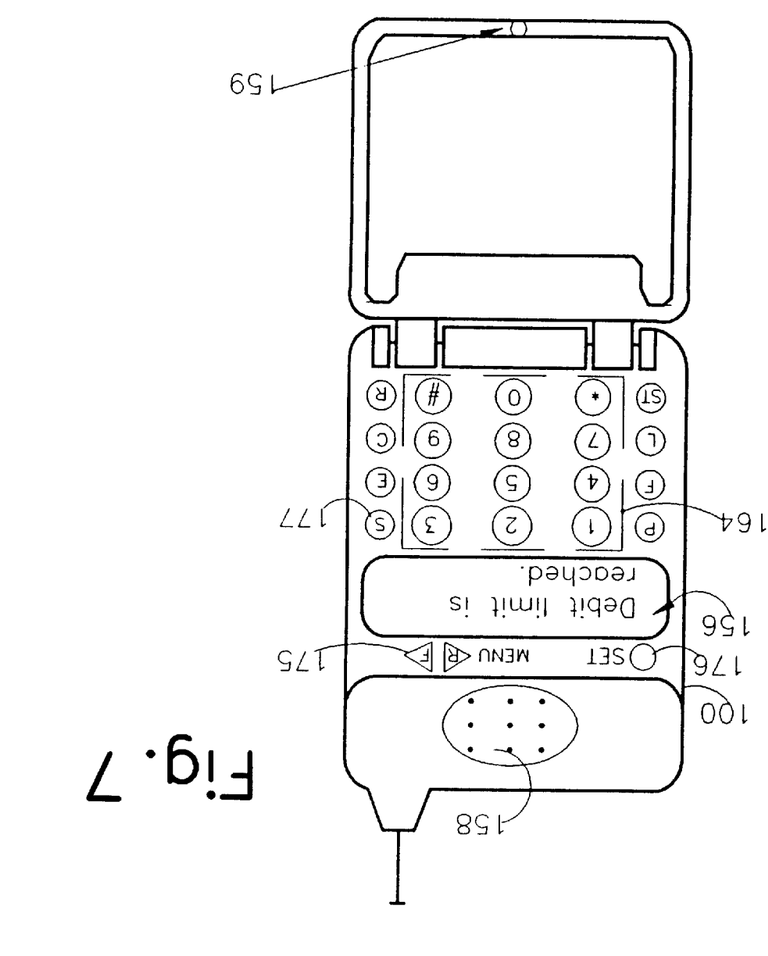
FIG. 7 illustrates the CCAD-DEBIT phone, according to the invention.

Referring to FIG. 7, a preferred embodiment of the CCAD Debit phone 100 is shown. The debit phone has a speaker 158, a microphone 159, and liquid crystal display (LCD) screen 156, menu keys 175 and set button 176. The keypad 164 is preferably used only for dialing landline telephone numbers or another mobile numbers. The menu keys are pressed to scroll through and find pre-determined or "canned" message responses for the debit phones two way paging response feature. Once the desired two way paging response is located in the menu selection displayed on the LCD screen 156, the set button 176 is pressed, then the send button 177 is pressed. This procedure causes the origination/registration packet to be transmitted in the heretofore described manner.

Additional objects and advantages will readily occur to those skilled in the art. The applications of the present methodology and apparatus are broad and may be used in a truly wide range of applications in wireless communications. Accordingly, the invention in its broader aspects is not limited to the specific details, representative device, and illustrative examples shown and described.

What is claimed is:

1. In a cellular mobile radio network having a voice channel for transmitting voice information and a control channel for transmitting control information that manages access to and use of the voice channel, a method of allocating a voice channel to a cellular mobile radiotelephone, comprising:
   a) transmitting a call origination message from the radiotelephone over the control channel, the call origination message comprising:
      i) a mobile identification number (MIN) uniquely identifying the radiotelephone;
      ii) a sequence of digits specifying a remote feature control request that invokes the forwarding of the sequence of digits by a serving mobile switching center (MSC) upon detecting the remote feature control request, and a count indicating time elapsed for a previous call by the radiotelephone;
   b) receiving the call origination message at the MSC;
   c) decoding the call origination message and detecting the MIN and the remote feature control request at the MSC;
   d) forwarding the remote feature control request and the count to a central monitoring station (CMS) associated with the MIN upon detecting the remote feature control request;
   e) comparing the count with a prepaid time associated with the MIN; and
   f) sending an approval message to the serving MSC if the prepaid time is greater than the count.

2. The method of claim 1, including the further step of:
   g) sending a cancellation message to the serving MSC if the prepaid time is less than or equal to the count.

3. The method of claim 1, wherein the step of sending an approval message to the serving MSC if the prepaid time is greater than the count includes the further step of allocating a voice channel for the radiotelephone.

4. The method of claim 2, wherein the step of sending a cancellation message to the serving MSC if the prepaid time is less than or equal to the count includes the step of blocking a voice channel for the radiotelephone.

5. In a wireless radio network having a voice channel for transmitting voice information and a control channel for transmitting control information that manages access to and use of the voice channel, a method of allocating a voice channel to a radiotelephone, comprising:
   a) transmitting a control message from the radiotelephone over the control channel, the control message comprising:
      i) a mobile identification number (MIN) uniquely identifying the radiotelephone;
      ii) a sequence of digits specifying a remote feature control request that invokes the forwarding of the sequence of digits by a serving mobile switching center (MSC) upon detecting the remote feature control request, and billing account information associated with the radiotelephone identified by the MIN;
   b) receiving the control message the MSC;
   c) decoding the control message and detecting the MIN and the remote feature control request;
   d) forwarding the remote feature control request and the billing account information to a central monitoring station (CMS) associated with the MIN upon detecting the remote feature control request;
   e) analyzing the billing account information associated with the MIN; and
   f) sending an approval message to the serving MSC if the billing account information indicates the billing account is in good standing.

6. The method of claim 5, wherein the control message is a call origination message.

7. The method of claim 5, wherein the control message is a registration notification message.

8. The method of claim 5, wherein the control message is an autonomous registration message.

9. The method of claim 5, wherein the billing account information associated with the radiotelephone identified by the MIN is the time elapsed for a previous call completed by the radiotelephone.

10. The method of claim 9, wherein forwarding the remote feature control request and the billing account information to the CMS associated with the MIN upon detecting the remote feature control request comprises forwarding the remote feature control request and time elapsed for a previous call completed by the radiotelephone to the CMS associated with the MIN upon detecting the remote feature control request.

11. The method of claim 10, wherein the step of analyzing the billing account information associated with the MIN includes the step of comparing the time elapsed for a previous call completed by the radiotelephone with an amount of prepaid time for the billing account.

12. The method of claim 11, wherein the step of sending an approval message to the serving MSC if the billing account information indicates the billing account is in good standing includes the step of sending an approval message to the serving MSC if the time elapsed for a previous call completed by the radiotelephone is less than the amount of prepaid time for the billing account.

13. The method of claim 11, further including the step of
   g) sending a cancellation message to the serving MSC if the billing account information indicates the billing account is not in good standing.

14. The method of claim 13, wherein the step of sending a cancellation message to the serving MSC if the billing account information indicates the billing account is not in good standing includes the step of sending a cancellation message to the serving MSC if the time elapsed for a previous call completed by the radiotelephone is more than the amount of prepaid time for the billing account.

15. In a wireless radio network having a voice channel for transmitting voice information and a control channel for transmitting control information that manages access to and use of the voice channel, a method for transmitting data related to a specific application from a radiotelephone to a central monitoring station over the control channel, comprising:
   a) transmitting a control message from the radiotelephone over the control channel, the control message comprising a mobile identification number (MIN) uniquely identifying the radiotelephone and a sequence of digits specifying a remote feature control request that invokes the forwarding of the sequence of digits by a serving mobile switching center (MSC) upon detecting the remote feature control request, billing account information associated with the radiotelephone identified by the MIN, and data related to a specific application;

b) receiving the control message at a serving mobile switching center (MSC);

c) decoding the control message and detecting the MIN and the remote feature control request;

d) forwarding the remote feature control request, the billing account information, and the data related to a specific application to a central monitoring station (CMS) associated with the MIN upon detecting the remote feature control request;

e) analyzing the billing account information associated with the MIN; and f) sending a data related to a specific application to an application specific CMS if the billing account information indicates the billing account is not in good standing.

16. The method of claim 15, including the further step of blocking the data related to a specific application from being sent to the application specific CMS if the billing account information indicates the billing account is not in good standing.

17. In a cellular mobile radio network having a voice channel for transmitting voice information and a control channel for transmitting control information that manages access to and use of the voice channel, a method of allocating a voice channel to a cellular mobile radiotelephone, comprising:

a) transmitting a call origination message from the radiotelephone over the control channel, the call origination message comprising:

i) a mobile identification number (MIN) identifying the radiotelephone;

ii) a count in a dialed digits field of the call origination message, the count indicating time elapsed for a previous call by the radiotelephone;

b) receiving the call origination message at the MSC;

c) forwarding the contents of the dialed digits field, comprising the count, to a central monitoring station (CMS) associated with the MIN;

d) comparing the count with a prepaid time associated with the MIN at the CMS; and e) sending an approval message from the CMS to the serving MSC if the prepaid time is greater than the count.

* * * * *